United States Patent
Kitatani et al.

(10) Patent No.: US 9,528,833 B2
(45) Date of Patent: Dec. 27, 2016

(54) NAVIGATION APPARATUS

(75) Inventors: Kenichi Kitatani, Kanagawa (JP); Hiroyuki Aoki, Kanagawa (JP); Yumi Katou, Kanagawa (JP); Ayumu Yagihashi, Kanagawa (JP); Atsuhiko Murayama, Kanagawa (JP); Seiji Sugahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 13/979,702

(22) PCT Filed: Dec. 1, 2011

(86) PCT No.: PCT/JP2011/006731
§ 371 (c)(1),
(2), (4) Date: Jul. 15, 2013

(87) PCT Pub. No.: WO2012/101713
PCT Pub. Date: Aug. 2, 2012

(65) Prior Publication Data
US 2013/0304371 A1    Nov. 14, 2013

(30) Foreign Application Priority Data
Jan. 26, 2011    (JP) .................. 2011-013972

(51) Int. Cl.
*G01C 21/00*    (2006.01)
*G01C 21/20*    (2006.01)
(Continued)

(52) U.S. Cl.
CPC .............. *G01C 21/00* (2013.01); *G01C 21/206* (2013.01); *G01C 21/3629* (2013.01); *H04R 5/04* (2013.01)

(58) Field of Classification Search
CPC ... G01C 21/206; G01C 21/00; G01C 21/3629; H04R 5/04; G08G 1/0969; G08G 1/096872
(Continued)

(56) References Cited

U.S. PATENT DOCUMENTS

| 5,406,492 A * | 4/1995 | Suzuki .................. 701/428 |
| 2009/0192707 A1* | 7/2009 | Nakatsuka et al. .......... 701/211 |

FOREIGN PATENT DOCUMENTS

| JP | 06-176296 A | 6/1994 |
| JP | 757190 A | 3/1995 |

(Continued)

OTHER PUBLICATIONS

Communication dated Jun. 30, 2014, from the European Patent Office in counterpart European Application No. 11856707.2.
(Continued)

*Primary Examiner* — Nga X Nguyen
(74) *Attorney, Agent, or Firm* — Sughrue Mion, PLLC

(57) ABSTRACT

A navigation apparatus 100 includes a current position information acquisition unit (a self-position acquisition unit 42) that acquires current position information, and a travel direction determination unit (for example, a route search unit 44) that determines a travel direction based on the acquired current position information and destination position information. The navigation apparatus 100 further includes a sound unit that outputs a sound (for example, a parametric speaker 30), and a sound control unit 41 that controls the sound unit so that the sound can be heard to the user from the travel direction.

8 Claims, 15 Drawing Sheets

(51) Int. Cl.
*G01C 21/36* (2006.01)
*H04R 5/04* (2006.01)

(58) Field of Classification Search
USPC ............... 701/408, 419, 428, 431, 441, 444
See application file for complete search history.

(56) References Cited

FOREIGN PATENT DOCUMENTS

| | | |
|---|---|---|
| JP | 07-159190 A | 6/1995 |
| JP | 10-197277 A | 7/1998 |
| JP | 2008-113190 A | 5/2008 |
| JP | 200940368 A | 2/2009 |
| JP | 2010-068023 A | 3/2010 |
| JP | 2010-091363 A | 4/2010 |

OTHER PUBLICATIONS

International Search Report of PCT/JP2011/006731 dated Jan. 10, 2012.

\* cited by examiner (a)

(b)

NAVIGATION APPARATUS

CROSS REFERENCE TO RELATED APPLICATIONS

This is a National Stage of International Application No. PCT/JP2011/006731 filed Dec. 1, 2011, claiming priority based on Japanese Patent Application No. 2011-013972 filed Jan. 26, 2011, the contents of all of which are incorporated herein by reference in their entirety.

TECHNICAL FIELD

The present invention relates to a navigation apparatus.

BACKGROUND ART

A general navigation apparatus guides a user through a travel direction using a display or a voice (for example, Patent Document 1).

In addition, in Patent Document 2, a technique is described which localizes an sound image at a predetermined position using a parametric speaker.

RELATED DOCUMENT

Patent Document

[Patent Document 1] Japanese Unexamined Patent Publication No. 2010-91363
[Patent Document 2] Japanese Unexamined Patent Publication No. 2010-68023

DISCLOSURE OF THE INVENTION

In a general navigation apparatus, even in a case where a travel direction is guided by a voice, if a user does not understand voice content as a language after carefully heard the voice, the user cannot recognize the travel direction.

An object of the present invention is to provide a navigation apparatus which enables a user to intuitively recognize a travel direction even if the user does not know the voice content.

The present invention provides an navigation apparatus including: a current position information acquisition unit that acquires current position information, a travel direction determination unit that determines a travel direction based on the acquired current position information and destination position information, a sound unit that outputs a sound, and a sound control unit that controls the sound unit so that the sound can be heard to a user from the travel direction.

According to the present invention, a user can intuitively recognize the travel direction even if the user does not know the voice content.

BRIEF DESCRIPTION OF THE DRAWINGS

The above-described object, other objects, features, and advantages will become more apparent from the preferred embodiments and the accompanied drawings which are described below.

DESCRIPTION OF EMBODIMENTS

Figure 1:
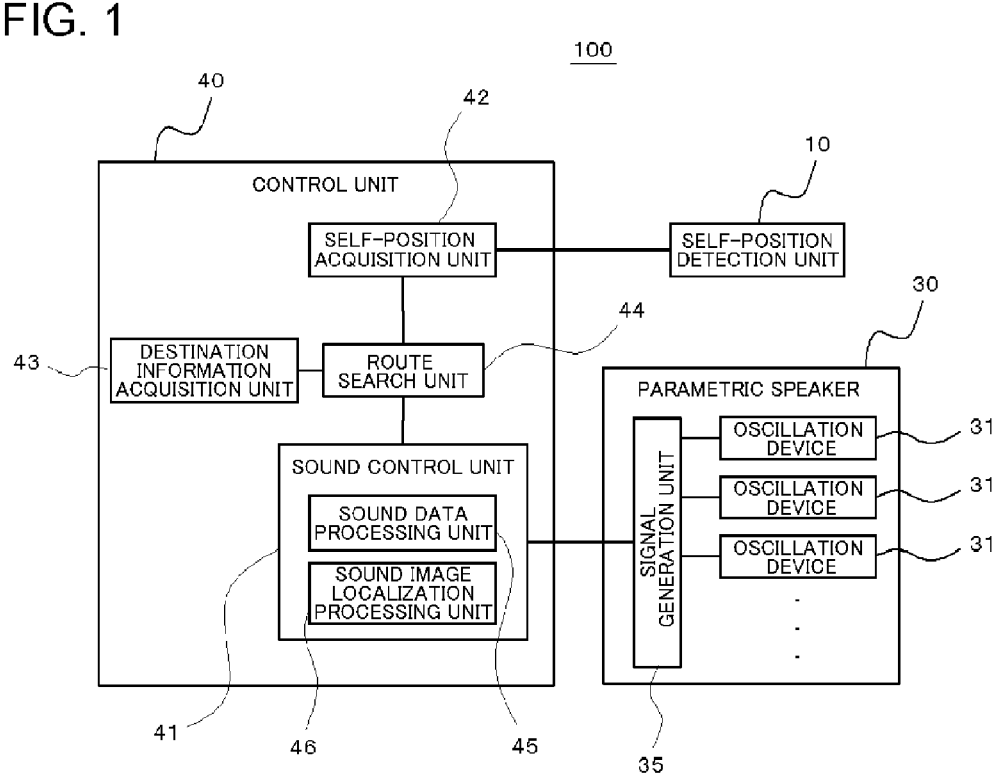
FIG. 1 is a block diagram illustrating a configuration of a navigation apparatus according to a first embodiment.

Hereinafter, embodiments according to the present invention will be described by using drawings. In addition, in all the drawings, the same configuration elements are denoted by the same reference numerals, and then will not be repeated.

First Embodiment

Figure 2:
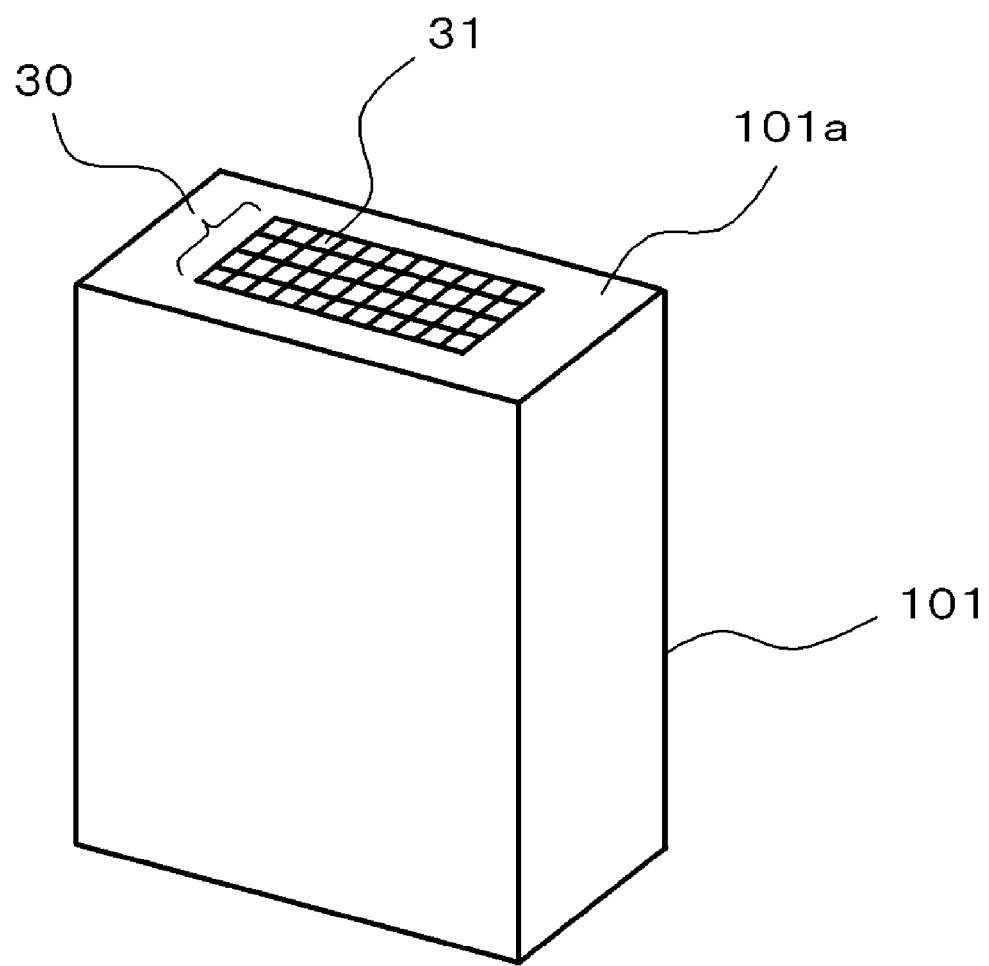
FIG. 2 is a schematic perspective view of the navigation apparatus according to the first embodiment.

FIG. 1 is a block diagram illustrating a configuration of a navigation apparatus 100 according to a first embodiment, and FIG. 2 is a schematic perspective view of the navigation apparatus 100 according to the first embodiment. FIGS. 3(a) and 3(b) are schematic diagram for describing an operation of the navigation apparatus 100 according to the first embodiment, between these, FIG. 3(a) is a view illustrating a user 1 which is viewed from a side direction (right side), and FIG. 3(b) is a view illustrating the user 1 which is viewed from a front direction.

The navigation apparatus 100 according to the present embodiment includes, a current position information acquisition unit (self-position acquisition unit 42) which acquires current position information, a travel direction determination unit (for example, route search unit 44) which determines a travel direction based on the acquired current position information and destination position information, a sound unit (for example, parametric speaker 30) which outputs a sound, and a sound control unit 41 which controls sound so that the sound may be heard to the user 1 (FIGS. 3(a) and 3(c)) from the travel direction. In addition, in the present embodiment, the navigation apparatus 100 is a mobile terminal apparatus (a mobile phone, a Personal Digital Assistance (PDA), a small game machine, or the like). In addition, the present embodiment describes an example in which the user carries the navigation apparatus 100 as a pedestrian. Hereinafter, it will be described in detail.

As illustrated in FIG. 1, the navigation apparatus 100 includes a control unit 40, a parametric speaker 30, and a self-position detection unit 10. In addition, for example, it is preferable that the navigation apparatus 100 have a communication function (an internet function, a phone call function, and the like).

For example, the self-position detection unit 10 detects its current position using a Global Positioning System (GPS) and the like.

The control unit 40 includes the self-position acquisition unit 42, a destination information acquisition unit 43, the route search unit 44, and the sound control unit 41.

The self-position acquisition unit 42 acquires information (hereinafter, current position information) indicating the current position detected by the self-position detection unit 10 from the self-position detection unit 10.

The destination information acquisition unit 43 acquires information (hereinafter, destination information) about a destination. The destination information includes at least information indicating a destination position. However, the destination information may include various other information.

For example, as a method of acquiring the destination information by the destination information acquisition unit 43, the information of a position selected by an operation of the user 1 from map information downloaded by the navigation apparatus 100 according to the operation of the user 1 is acquired as the destination information, but the position information may be acquired by other method.

The route search unit 44 searches a route necessary to reach the destination from the current position, based on the current position information acquired by the self-position acquisition unit 42, and the destination position information acquired by the destination information acquisition unit 43. Furthermore, the route search unit 44 determines a travel direction that has to be currently directed based on the route which searched.

The sound control unit 41 includes a sound data processing unit 45 and a sound image localization processing unit 46, and controls the parametric speaker 30.

The sound data processing unit 45 performs a regeneration process of the sound heard by the user 1 when the navigation operates.

The sound image localization processing unit 46 performs a process to form (localize) a sound image on a travel direction position based on the user 1. In other words, the sound image localization processing unit 46 controls a directivity of the sound output from the parametric speaker 30 according to the travel direction determined by the route search unit 44, and allows the user 1 to hear the sound from the travel direction. In this manner, the user 1 can intuitively recognize whether to go in any direction, from a direction where the sound is heard.

Each oscillation device 31 in the parametric speaker 30 is controlled by the sound image localization processing unit 46, and thereby the sound image can be formed in a desirable area. That is the sound image can be localized in a desirable area.

Figure 3:
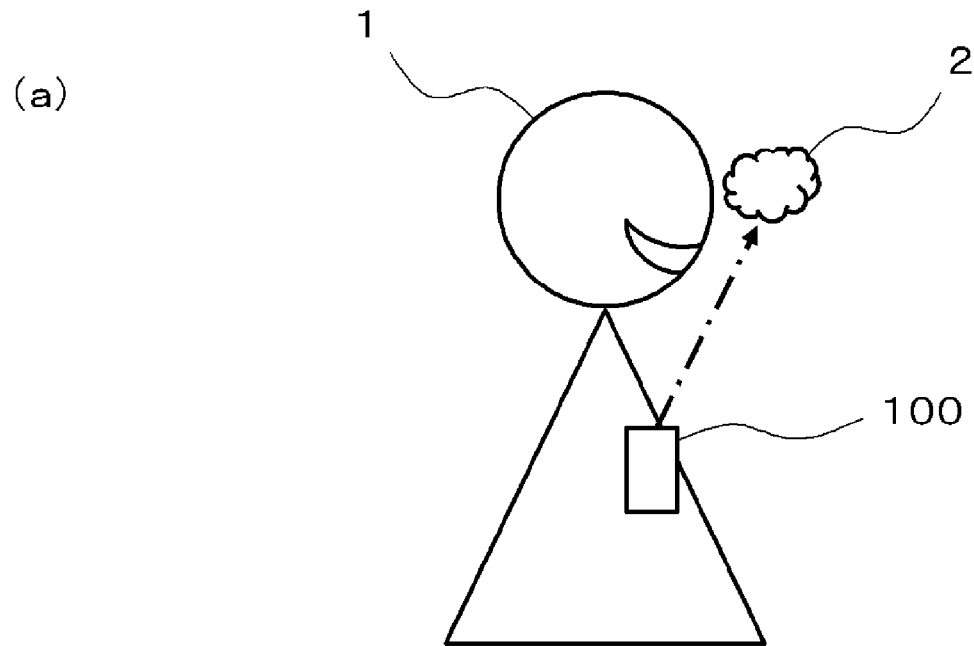
FIGS. 3(a) and 3(b) are schematic diagrams for describing an operation of the navigation apparatus according to the first embodiment.
Figure 3:
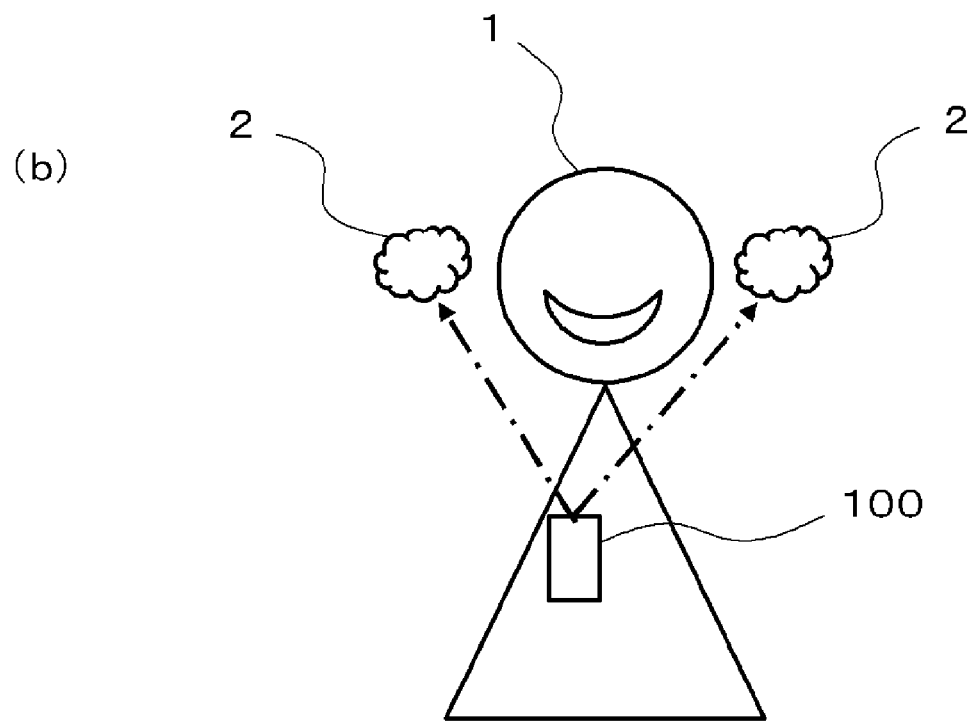

Specifically, the sound image localization processing unit 46 controls each oscillation device 31 so that the sound image 2 may be formed in front of the user 1 in a case where the travel direction is the front (FIG. 3 (*a*)), controls each oscillation device 31 so that the sound image 2 may be formed on the left side of the user 1 in a case where the travel direction is left (FIG. 3 (*b*)), and controls each oscillation device 31 so that the sound image 2 may be formed on the right side of the user 1 in a case where the travel direction is right (FIG. 3 (*b*)).

In order to realize such an operation, for example, the sound image localization processing unit 46 stores in advance a phase value of ultrasonic wave output from each oscillation device 31 (alternatively, a relative shift amount value of the phase of the ultrasonic wave which is output from the each oscillation device 31), as a table, for each travel direction. Then, the sound image localization processing unit 46 extracts a value corresponding to the travel direction that has to be currently directed, from the table, and controls the phase of each oscillation device 31, based on the value.

In addition, the sound image localization processing unit 46 controls the directivity of the parametric speaker 30 so that a private sound field with respect to the user 1 may be formed, and allows the sound to be heard by the user 1 only. Specifically, for example, the sound image is formed in an area within 30 cm from ears of the user 1.

In the present embodiment, it is assumed that both of a distance between the navigation apparatus 100 which is the mobile terminal apparatus and ears of the user 1, and an ear direction which is viewed from the navigation apparatus 100 are maintained substantially constant, and thereby the navigation apparatus 100 performs a navigation operation. Specifically, for example, it is assumed that the navigation operation is performed in a state where the user 1 has the navigation apparatus 100 in his breast pocket. However, even in this case, there is a case where the distance and the like between the parametric speaker 30 and the ears of the user 1 are different from each other depending on a body size of the user 1, clothing design, or the like. For this reason, the user 1 registers the distance in advance, and thereby the position where the sound image 2 is formed by the parametric speaker 30 may be configured to be properly adjusted. Alternatively, the user 1 may be able to fine-tune the directivity of the parametric speaker 30 so that a voice guide during the navigation operation may be easily heard.

For example, the parametric speaker 30 is configured to include the multiple oscillation devices 31 which oscillate respectively the ultrasonic wave, in an array type. For example, the oscillation devices 31 are arranged in a matrix form. Furthermore, the parametric speaker 30 includes a signal generation unit 35 which generates an electrical signal input to each oscillation device 31.

As illustrated in FIG. 2, for example, the navigation apparatus 100 includes a housing 101 in a rectangular parallelepiped shape. The multiple oscillation devices 31 are arranged on an end surface 101*a* in the longitudinal direction of the housing 101. Therefore, for example, the navigation apparatus 100 is put in the breast pocket so that the end surface 101*a* may be upward, and thereby the oscillation devices 31 are directed upward, in other words, towards the face of the user.

In addition, FIG. 2 illustrates an example which describes the navigation apparatus 100 that is a simple rectangular shape, but the navigation apparatus 100 may be other form. For example, the navigation apparatus 100 may be a folding type with a first housing and a second housing which are foldably connected to each other, and may be a slide type with the first housing and the second housing which are slidably connected to each other.

Figure 4:
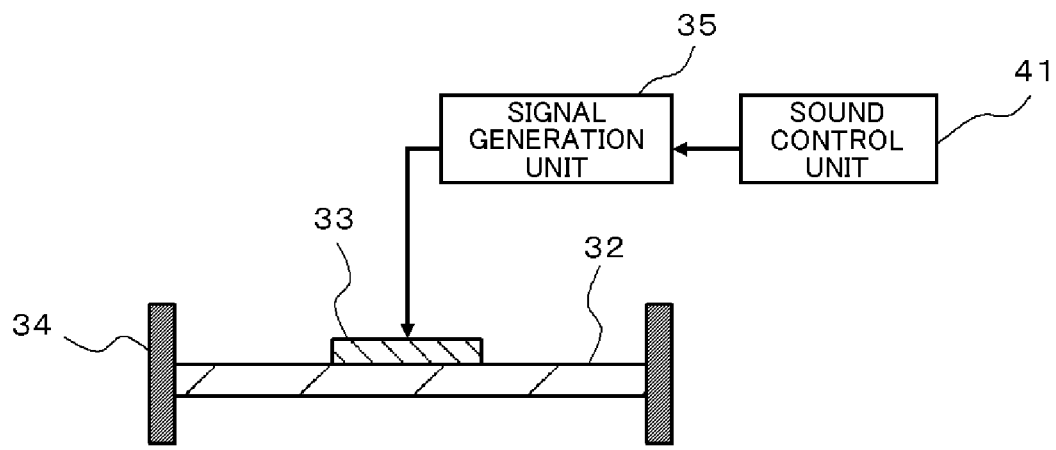
FIG. 4 is a schematic diagram of an oscillation device which is included in the navigation apparatus according to the first embodiment.

FIG. 4 is a schematic diagram of the oscillation device 31.

For example, the oscillation device 31 includes a sheet-like vibration member 32, a vibrator 33, and a support member 34. For example, the vibrator 33 is a piezoelectric vibrator, and is attached to one surface of the vibration member 32. The support member 34 supports an edge of the vibration member 32. In addition, for example, the support member 34 is fixed to a circuit board (not illustrated) of the navigation apparatus 100 or the housing 101.

The signal generation unit 35 and the sound control unit 41 configure an oscillation circuit which vibrate the vibrator 33 by inputting an oscillation signal to the vibrator 33, and vibrates sound wave using the vibrator 33 and the vibration member 32.

The vibration member 32 is vibrated by a vibration generated by the vibrator 33, and oscillates the sound wave with a frequency equal to or more than 20 kHz, for example. In addition, the vibrator 33 oscillates the sound wave with a frequency equal to or more than 20 kHz, for example, by vibrating itself. In addition, the vibration member 32 adjusts a fundamental resonance frequency of the vibrator 33. The fundamental resonance frequency of a mechanical vibrator depends on a load weight and compliance. The compliance is a mechanical rigidity of the vibrator, and thus the fundamental resonance frequency of the vibrator 33 can be controlled by controlling the rigidity of the vibration member 32. In addition, it is preferable that thickness of the vibration member 32 be equal to or more than 5 um and equal to or less than 500 um. In addition, it is preferable that the vibration member 32 have a longitudinal elastic modulus equal to or more than 1 Gpa and equal to or less than 500 Gpa, which is an index indicating the rigidity. In a case where the rigidity of the vibration member 32 is too low, or too high, there is a possibility of damaging characteristic or reliability of the mechanical vibrator. In addition, materials configuring the vibration member 32 are not particularly limited, if the materials have a high elastic modulus such as metal or resin with respect to the vibrator 33 formed by brittle materials. But it is preferable that the materials configuring the vibration member 32 be phosphor bronze, stainless or the like from the viewpoint of workability or a cost.

In the present embodiment, a planar shape of the vibrator 33 is a circle. However, the planar shape of the vibrator 33 is not limited to a circle. In the vibrator 33, an entire surface of the surface facing the vibration member 32 is fixed to the vibration member 32 using an adhesive agent. Thus, the entire surface of one surface of the vibrator 33 is restrained by the vibration member 32.

The signal generation unit 35 generates an electric signal input to the vibrator 33, in other words, a modulation signal of the oscillation device 31. For example, carrier wave of the modulation signal is ultrasonic wave with a frequency equal to or more than 20 kHz, specifically, ultrasonic wave with a frequency of 100 kHz, for example. The sound control unit 41 controls the signal generation unit 35 depending on a sound signal of the sound to be regenerated.

Figure 5:
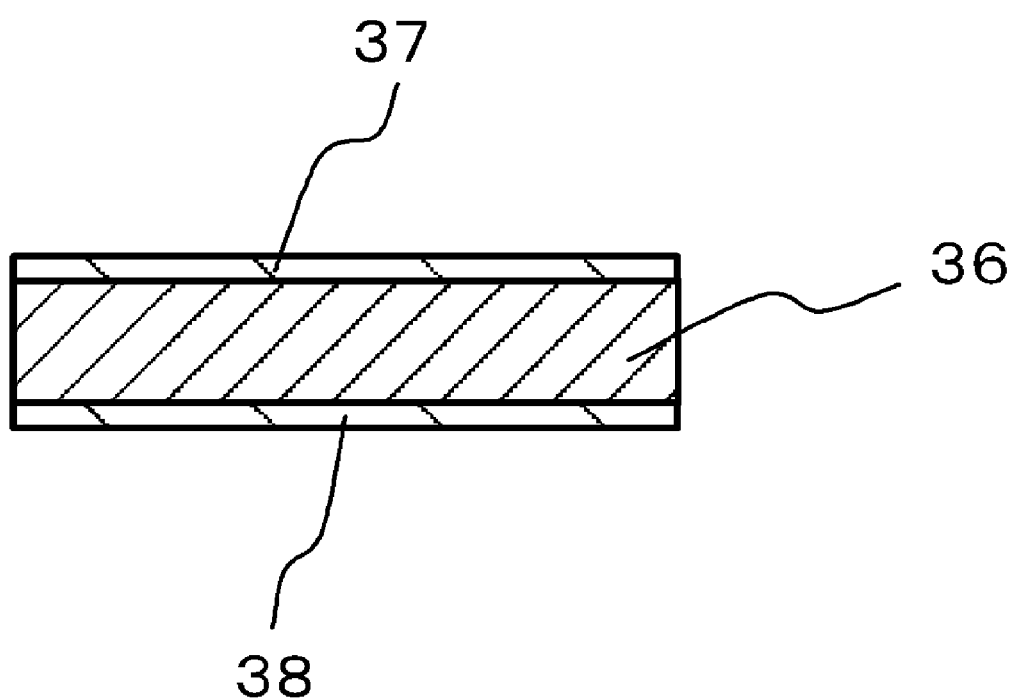
FIG. 5 is a cross-sectional view illustrating a layer structure of a vibrator.

FIG. 5 is a cross-sectional view illustrating a layer structure of a thickness direction of the vibrator 33. The vibrator 33 includes a piezoelectric body 36, an upper surface electrode 37, and a lower surface electrode 38.

The piezoelectric body 36 is polarized in a thickness direction. Materials configuring the piezoelectric body 36 may be anyone of inorganic materials and organic materials, as long as they are materials with piezoelectric effect. However, it is preferable that the materials configuring the piezoelectric body 36 be materials with a high electromechanical conversion efficiency such as lead zirconate titanate (PZT) or barium titanate (BaTiO3). For example, a thickness h1 of the piezoelectric body is equal to or more than 10 um and equal to or less than 1 mm. In a case where the thickness h1 is less than 10 um, there occurs a possibility that the vibrator 33 is corrupted, while the oscillation device 31 is manufactured. In addition, in a case where the thickness h1 is more than 1 mm, the electromechanical conversion efficiency becomes too low, thereby there is a possibility that a sufficiently large vibration is not acquired. The reason is that, if the thickness of the vibrator 33 becomes thicker, electric field strength within the piezoelectric vibrator is reduced in inverse proportion.

Materials configuring an upper surface electrode 37 and a lower surface electrode 38 are not particularly limited, but silver or a silver/palladium alloy can be used, for example. The silver is used as general electrode materials because of low resistance, and thus it has advantages in a manufacturing process or a cost. The silver/palladium alloy is low resistance materials with excellent oxidation resistance, and thus it has advantages from the viewpoint of the reliability. In addition, a thicknesses h2 of the upper surface electrode 37 and the lower surface electrode 38 are not particularly limited, but it is preferable that the thicknesses h2 be equal to or more than 1 um and equal to or less than 50 um. In a case where the thicknesses h2 are less than 1 um, it is difficult to uniformly form the upper surface electrode 37 and the lower surface electrode 38, and thus there is a possibility that the electromechanical conversion efficiency is lowered. In addition, in a case where the thicknesses of the upper surface electrode 37 and the lower surface electrode 38 are more than 100 um, the upper surface electrode 37 and the lower surface electrode 38 become a restraint surface with respect to the piezoelectric body 36, and there occurs a possibility that an energy conversion efficiency is lowered.

The vibrator 33 can be formed to have an outer diameter of Φ18 mm, an internal diameter of Φ12 mm, and a thickness of 100 um. In addition, for example, as the upper surface electrode 37 and the lower surface electrode 38, the silver/palladium alloy (for example, weight ratio is 7:3) with thickness of 8 um can be used. In addition, the vibration member 32 can use a phosphor bronze with an outer diameter of Φ20 mm and a thickness of 50 um (0.3 mm). The support member 34 functions as a case of the oscillation device 31, for example, is formed in a cylindrical shape (for example, circular cylindrical shape) with an outer diameter of Φ22 mm, and an internal diameter of Φ20 mm.

The parametric speaker 30 emits ultrasonic wave (carrier wave) which is modulated by any one of AM modulation, DSB modulation, SSB modulation, FM modulation, into air from each of multiple oscillation devices 31, and generates an audible sound using non-linearity characteristic when the ultrasonic wave is propagated in the air. The term "non-linear" herein indicates a transition from a laminar flow to a turbulent flow when the Reynolds number expressed by the ratio of the inertial action and the viscous action of a flow increases. The sound wave is very slightly disturbed in the flow, and thus the sound wave is non-linearly propagated. Particularly, the non-linearity of the sound wave can be easily observed in an ultrasonic frequency band. Then, in a case where the ultrasonic wave is emitted into the air, higher harmonic wave accompanied by the non-linearity of the sound wave is remarkably generated. In addition, the sound wave is in a sparse and dense state in which light and shade is generated in a molecular density in the air. Then, in a case where air molecules require more time in being restored than being compressed, air which cannot be restored after being compressed collides with the air molecules which are continuously propagated, and thereby impulse wave is generated. The audible sound is generated by the impulse wave, in other words, the audible sound is regenerated (demodulated). The parametric speaker 30 has advantages of high sound directivity.

Next, a series of operations will be described.

First, the current position information is acquired by the self-position acquisition unit 42. In addition, the destination information is acquired by the destination information acquisition unit 43.

Next, the route search unit 44 searches the route based on the current position information and the destination information, and determines the travel direction to be currently travelled based on the searched route.

Next, the sound data processing unit 45 controls the parametric speaker 30, and thereby performing a sound regeneration process which is heard to the user when the navigation operates.

Here, the regenerated data of the sound (sound data) may be stored to be retained by the navigation apparatus 100 in advance. For example, the voice in this case is the information indicating the travel direction (please go ahead, please go to the right, or the like), however, alternatively, it may be music.

In addition, the sound data may be input from outside to the navigation apparatus 100. For example, the sound which is frequently downloaded (for example, downloaded from Web) from outside to the navigation apparatus 100 may be regenerated, and the sound which is currently heard at the destination, or the voice heard from the other party of a phone call may be regenerated. More specifically, for example, the destination information is received from a terminal apparatus (not illustrated) of a person already located in the destination, and the voice of talking with the person may be regenerated.

In addition, the type of sound being regenerated may be arbitrarily selected by the user 1.

In addition, in parallel with the regeneration process of the sound data processing unit 45, the sound image localization processing unit 46 controls the directivity of the sound output from the parametric speaker 30, and allows the user 1 to hear the sound from the travel direction.

Figure 6:
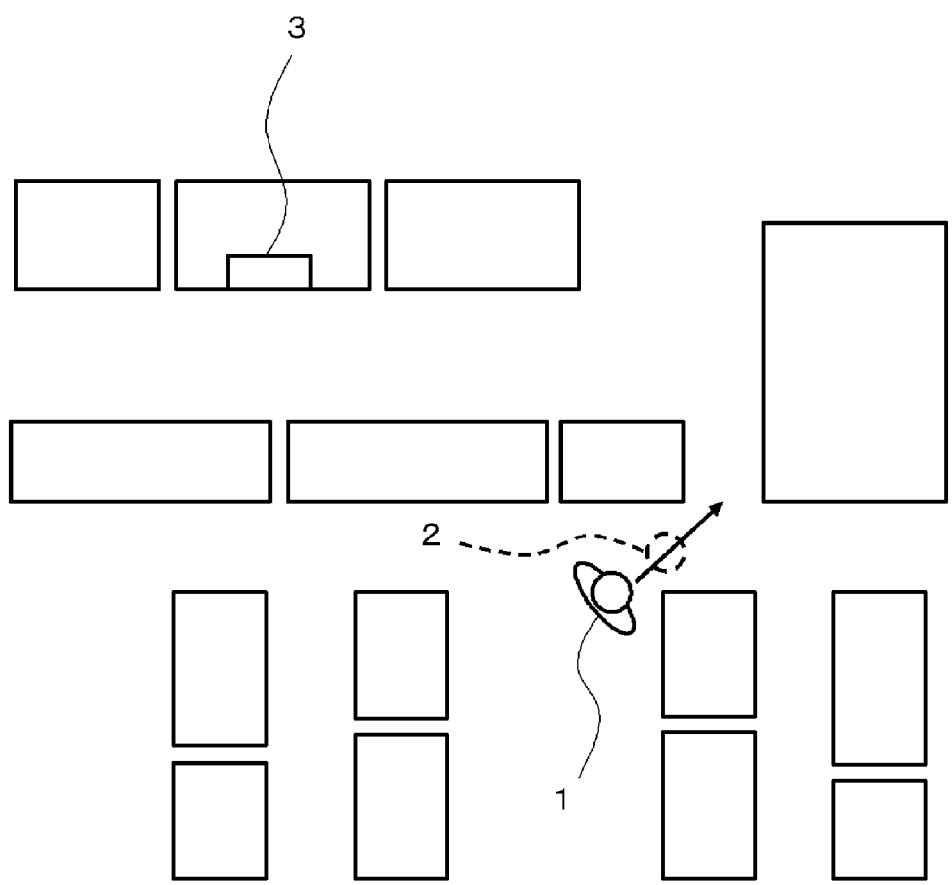
FIG. 6 is a schematic plan view for describing an operation of the navigation apparatus according to the first embodiment.

FIG. 6 is a schematic plan view for describing the operation of the navigation apparatus 100 according to a first embodiment. FIG. 6 illustrates an operation when the user 1 heads for the destination 3.

If the travel direction is changed according to a movement of the user 1, the position where the sound image 2 is localized is frequently changed. In other words, the user 1 can be guided to the destination by the frequent performance of such an operation.

According to the first embodiment described above, the parametric speaker 30 is controlled so that the sound may be heard to the user 1 from the travel direction, and thus the user 1 does not even know (even though inaudible) content of the voice, but can intuitively recognize the travel direction from the direction from which the sound is heard. In other words, an intuitive navigation is possible.

In addition, the navigation operation is performed by forming private sound image 2 using the parametric speaker 30 which is a directional speaker, and thereby it is possible that the sound is not heard to people around the user 1.

In addition, since the travel direction is recognized to the user 1 by localizing the sound image 2 in the travel direction, it is not necessary that the content of the sound is always the information (please go ahead, please go to the right, or the like) indicating the travel direction, and the content of the sound can be configured of other useful information (advertisement and the like). For example, information on goods treated at the destination or service, music (song), the sound indicating a current status of a shop in the destination, and the like may be regenerated in the travel direction of the user 1.

In addition, the navigation operation may be actively started by the user 1, but may be automatically started by the navigation apparatus 100, or may be started by a command of an apparatus outside the navigation apparatus 100. For example, in a case where the user 1 passes through a specified area while walking down a street, the navigation operation can be started by the command of the external apparatus with respect to the navigation apparatus 100. Even in this case, the information (the advertisement and the like) can be delivered to the user without discomfort. In addition, as a result of the user's movement guided by the navigation operation, the information delivery is performed while situations around the user 1 are frequently changed, and thereby the information delivery accompanied by a realistic sense can be realized, and an advertisement effect can be increased.

In addition, even in a case where the navigation apparatus 100 is a mobile type as is the present embodiment, the navigation operation also can be performed in a case where the user is a driver of a vehicle or the like rather than a pedestrian.

Second Embodiment

Figure 7:
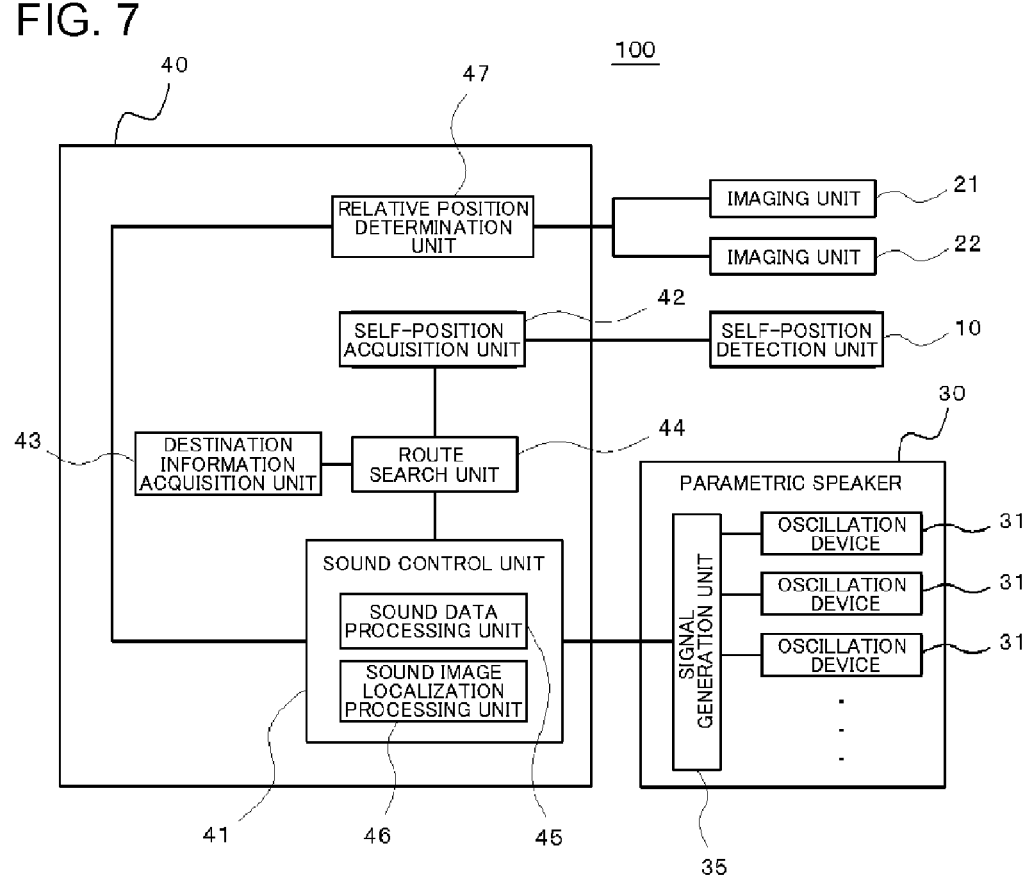
FIG. 7 is a block diagram illustrating a configuration of the navigation apparatus according to a second embodiment.
Figure 8:
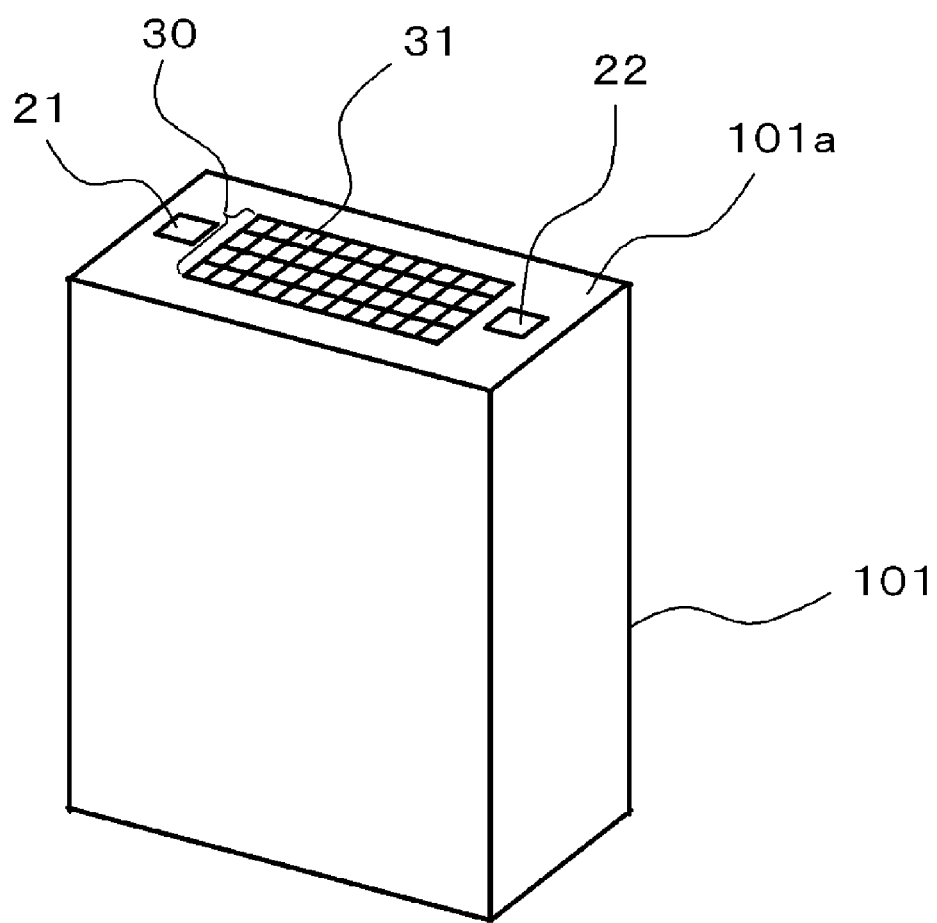
FIG. 8 is a schematic perspective view of the navigation apparatus according to the second embodiment.

FIG. 7 is a block diagram illustrating a configuration of a navigation apparatus 100 according to a second embodiment, and FIG. 8 is a schematic perspective view of the navigation apparatus 100 according to the second embodiment.

In the first embodiment described above, it is assumed that the navigation operation is performed so that a relative position between the navigation apparatus 100 and the ears of the user 1 may be maintained nearly constant. On the other hand, the second embodiment will be described with regard to an example in which it is assumed that the relative position between the navigation apparatus 100 and the ears of the user 1 may be changed.

As illustrated in FIG. 7, the navigation apparatus 100 according to the present embodiment includes multiple (for example, 2 units) imaging units (cameras) 21 and 22 which image respectively the user 1, and a relative position determination unit 47, in addition to the configuration of FIG. 1. For example, as illustrated in FIG. 8, the imaging units 21 and 22 are arranged on the end surface 101a.

Each of the imaging units 21 and 22 outputs respectively image data acquired by imaging of the user 1 to the relative position determination unit 47 in the control unit 40.

The relative position determination unit 47 determines a relative position relationship between the ears of the user 1 and the parametric speaker 30 of the navigation apparatus 100, by performing analysis (image processing) with respect to the image input from the imaging units 21 and 22. The relative position relationship includes a distance between the ears of the user 1 and the parametric speaker 30, and a direction of the ears of the user 1 viewed from the parametric speaker 30.

In addition, a position relationship detection unit which detects the relative position relationship between the user 1 and the parametric speaker 30 is configured of the imaging units 21 and 22 and the relative position determination unit 47.

The sound image localization processing unit 46 corrects a position where the sound image 2 is formed according to the relative position relationship determined by the relative position determination unit 47. In other words, regardless of the relative position relationship between the ears of the user 1 and the parametric speaker 30 of the navigation apparatus 100, always, the parametric speaker 30 is controlled so that the sound image 2 may be formed in the position of the travel direction based on the user 1.

According to the second embodiment described above, regardless of the relative position relationship between the ears of the user 1 and the parametric speaker 30 of the navigation apparatus 100, the sound can be heard to the user 1 from the travel direction.

In addition, the second embodiment describes with regard to an example in which the position relationship detection unit is configured of the imaging units 21 and 22 and the relative position determination unit 47, but the relative position determination unit may be configured of the imaging units 21 and 22, an ultrasonic wave sensor (sonar), and the relative position determination unit 47. In this case, the direction of the ears of the user 1 which is viewed from the parametric speaker 30 can be determined based on the image acquired by the imaging units 21 and 22, and the distance between the ears of the user 1 and the parametric speaker 30 can be determined based on a detection result using the ultrasonic wave sensor.

Third Embodiment

Figure 9:
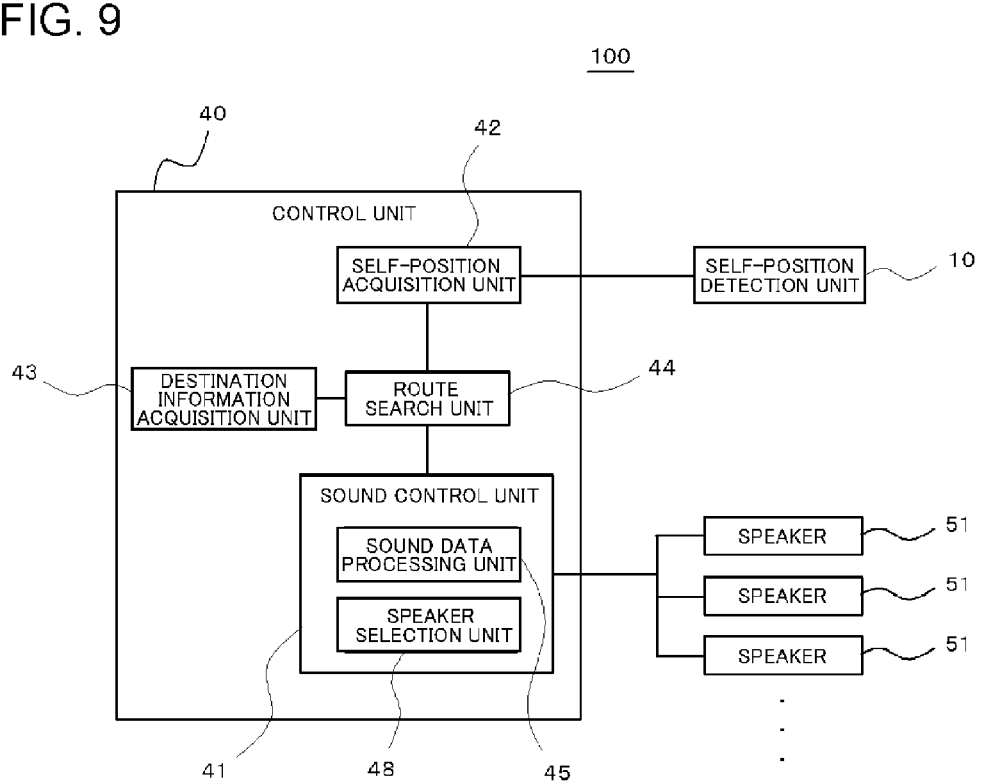
FIG. 9 is a block diagram illustrating a configuration of a navigation apparatus according to a third embodiment.
Figure 10:
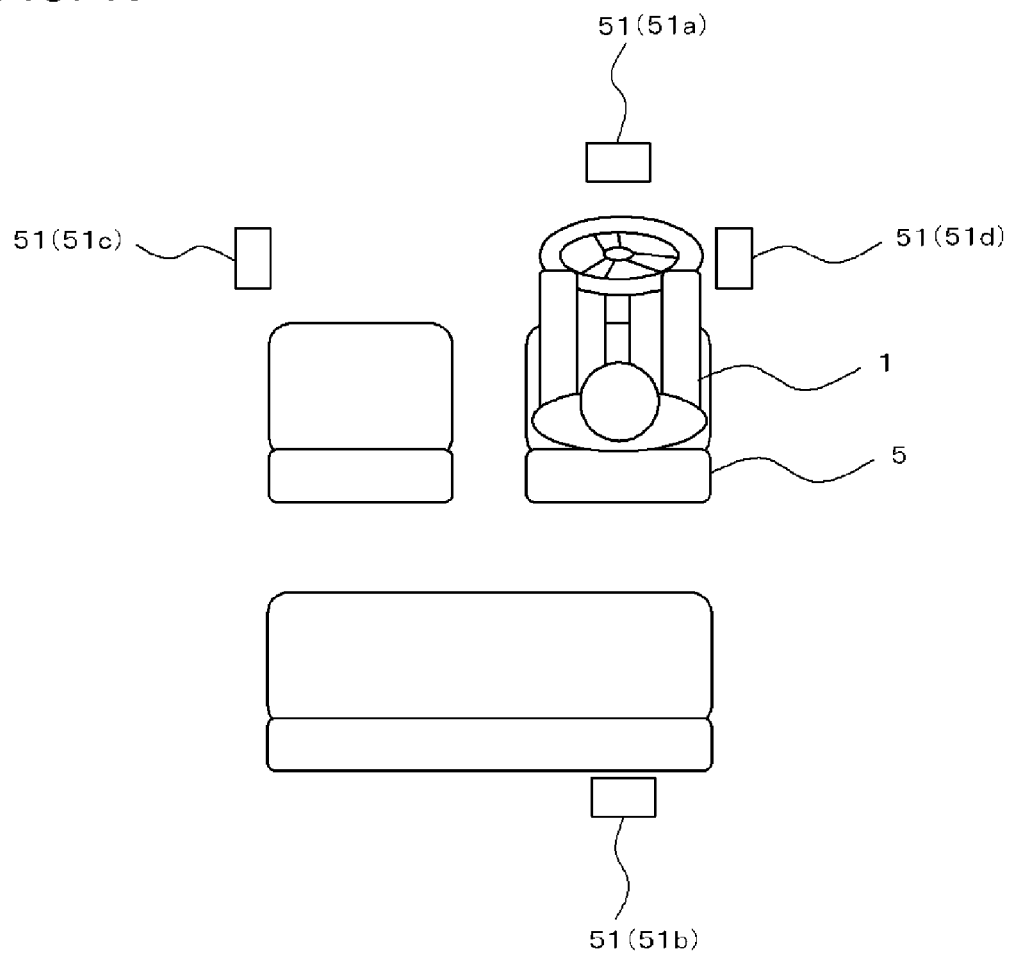
FIG. 10 is a schematic plan view for describing a configuration of the navigation apparatus according to the third embodiment.

FIG. 9 is a block diagram illustrating a configuration of a navigation apparatus 100 according to a third embodiment, and FIG. 10 is a schematic plan view for describing a configuration of the navigation apparatus 100 according to the third embodiment.

Each of the above-described embodiments describes with regard to an example in which the navigation apparatus 100 is the mobile terminal apparatus, but the present embodiment will be described with regard to an example in which the navigation apparatus 100 is a vehicle mounting type.

In the third embodiment, the sound unit is configured of multiple speakers 51 that are dispersed and arranged around a driver's seat in a vehicle, and the sound control unit 41 selectively outputs the sound from a speaker 51 corresponding to the travel direction, among the multiple speakers 51. In other words, the sound control unit 41 includes a speaker selection unit 48 instead of having no sound image localization processing unit 46. The speaker selection unit 48 selects the speaker 51 which performs a sound output for the navigation operation among the multiple speakers 51.

Each of the above-described embodiments describes with regard to an example in which the sound unit is the directional speaker (for example, the parametric speaker 30). On the other hand, in the present embodiment, for example, the speakers 51 are configured of conductivity type electro-acoustic transducers. The conductivity type electro-acoustic transducers include respectively a permanent magnet, a voice coil, and a vibration film.

As illustrated in FIG. 10, as an example, the speaker 51a arranged in front of the driver's seat 5 in the vehicle, the speaker 51b arranged behind the driver's seat 5, the speaker 51c arranged on the left of the driver's seat 5, and the speaker 51d arranged on the right of the driver's seat 5 are included in the speakers 51, for example.

In the present embodiment, in a case where the travel direction is the front, the sound is selectively output from the speaker 51a among the speakers 51a to 51d. In the same manner, in a case where the travel direction is the left, the sound is selectively output from the speaker 51c, and in a case where the travel direction is the right, the sound is selectively output from the speaker 51d. In addition, in a case where the travel direction is the rear (for example, in a case where the user 1 receives a notification when the user 1 has gone too far before), the sound is selectively output from the speaker 51b.

The sound can be heard from the travel direction to the user 1 which is the driver of the vehicle, even using such third embodiment, and thus the user 1 does not know even the content of the voice, but can recognize the travel direction.

In addition, the speakers 51 can be arranged around the user 1 as many as necessary, and thus the sound output can be easily performed from 360° around the user 1, and for example, the sound output from the rear of the user 1 also can be performed.

Fourth Embodiment

Figure 11:
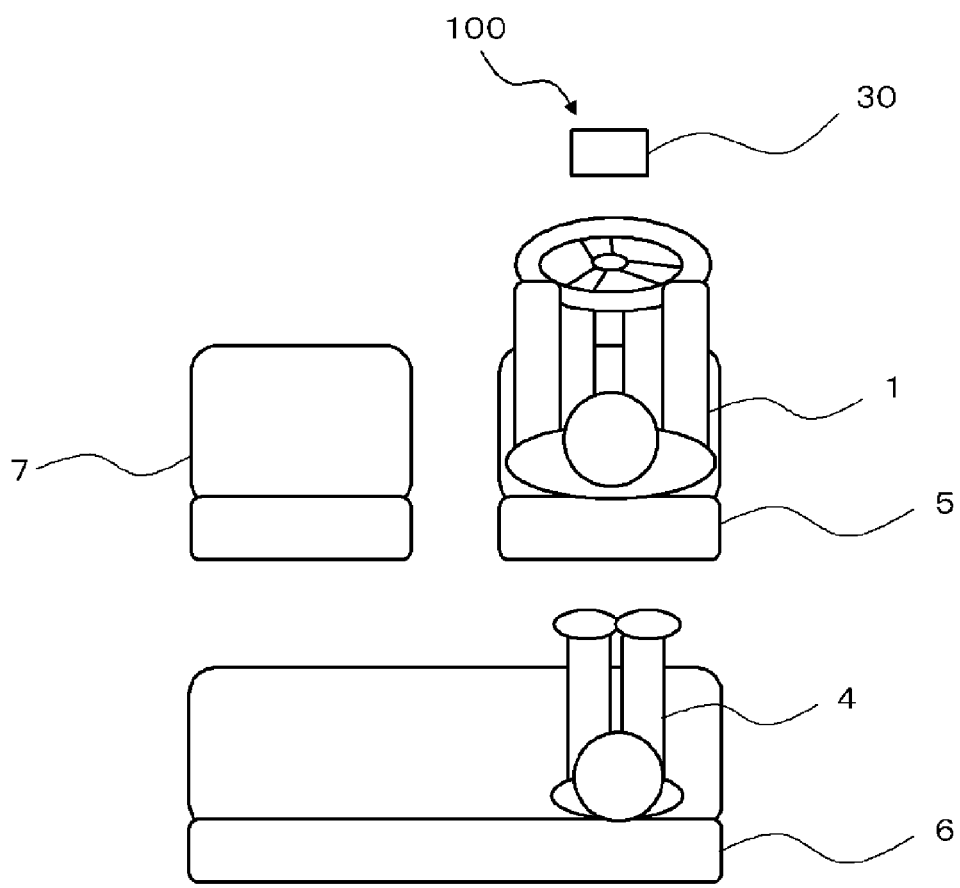
FIG. 11 is a schematic plan view for describing a configuration of a navigation apparatus according to a fourth embodiment.

FIG. 11 is a schematic plan view for describing a configuration of a navigation apparatus 100 according to a fourth embodiment.

The third embodiment describes with regard to an example in which the speaker 51 that is not the directional speaker is used, in a case where the navigation apparatus 100 is a vehicle mounting type. On the other hand, in the fourth embodiment, even in a case where the navigation apparatus 100 is the vehicle mounting type, the sound images are formed in the position of the travel direction based on the user 1 using the directional speaker (for example, the parametric speaker 30). In addition, the configuration of the navigation apparatus 100 according to the present embodiment is the same as that illustrated in FIG. 1.

In the present embodiment, a private sound field can be formed around the user 1 that is the driver, and thereby an occupant sitting in a rear seat 6 or a passenger seat 7 cannot hear the sound generated by the navigation operation. Therefore, for example, in a case where a child 4 is sleeping in the rear seat 6, sleep of the child 4 cannot be disturbed.

Fifth Embodiment

Figure 12:
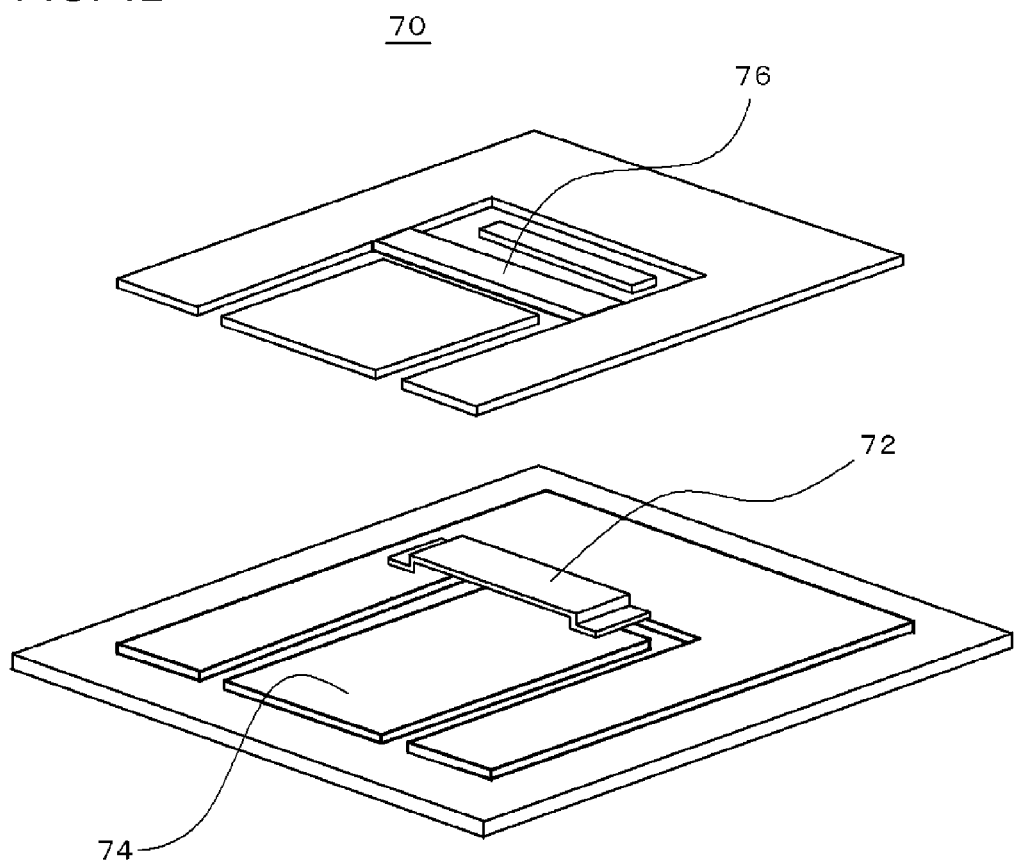
FIG. 12 is an exploded perspective view illustrating a configuration of a MEMS actuator which is used as a vibrator of an oscillation device included in a navigation apparatus according to a fifth embodiment.

The oscillation device 31 of the navigation apparatus 100 according to the present embodiment includes a Micro Electro Mechanical System (MEMS) actuator 70 illustrated in FIG. 12 instead of the vibrator 33 (FIG. 4). In other respects, the navigation apparatus 100 according to the present embodiment is configured of the same as the navigation apparatus 100 according to the first to fourth embodiments.

In the example illustrated in FIG. 12, an actuating method of the MEMS actuator 70 is a piezoelectric method, and the MEMS actuator 70 has a structure with a piezoelectric thin film 72 interposed between an upper movable electrode layer 74 and a lower movable electrode layer 76. The MEMS actuator 70 is operated by inputting a signal to the upper movable electrode layer 74 and the lower movable electrode layer 76 from the signal generation unit 35. In a manufacture of the MEMS actuator 70, for example, an aerosol deposition method is used, but it is not limited to this method. However, in a case where the aerosol deposition method is used, it is preferable that the piezoelectric thin film 72, the upper movable electrode layer 74 and the lower movable electrode layer 76 can be deposited respectively even on a curved surface. In addition, the actuation method of the MEMS actuator 70 may be an electrostatic method, an electromagnetic method, or a thermal conductivity method.

Sixth Embodiment

Figure 13:
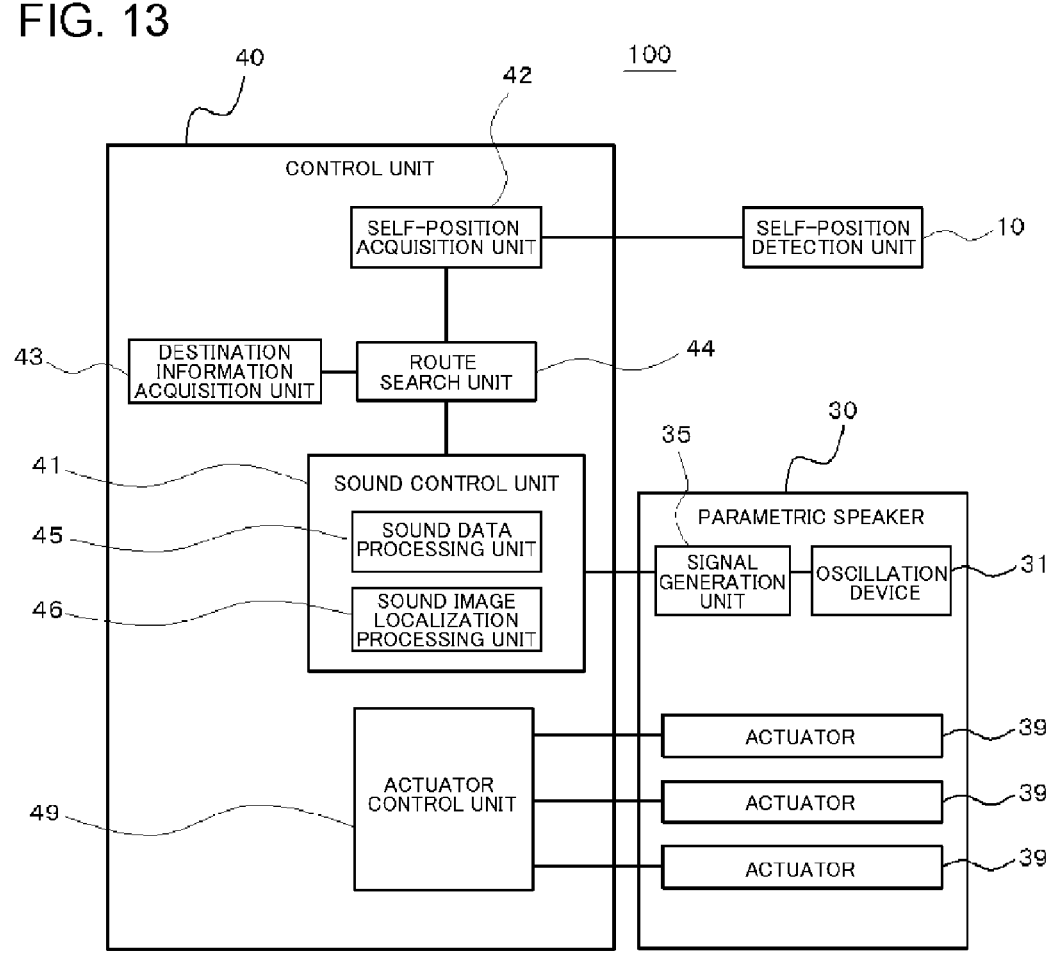
FIG. 13 is a block diagram illustrating a configuration of a navigation apparatus according to a sixth embodiment.
Figure 14:
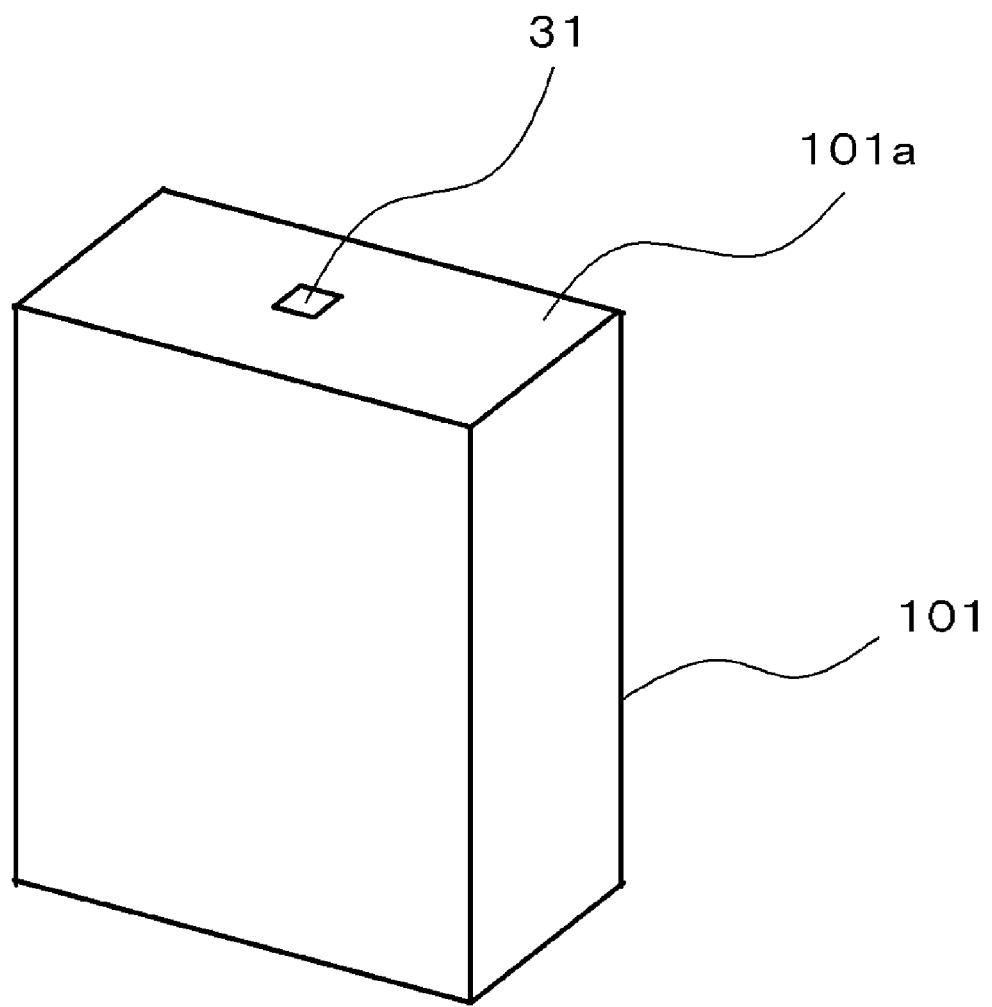
FIG. 14 is a schematic perspective view of the navigation apparatus according to the sixth embodiment.

FIG. 13 is a block diagram illustrating a configuration of a navigation apparatus 100 according to a sixth embodiment, FIG. 14 is a schematic perspective view of the navigation apparatus 100 according to the sixth embodiment, and FIGS. 15(a) to 15(c) are schematic diagrams for describing an operation of the navigation apparatus 100 according to the sixth embodiment.

The above-described first embodiment has been described with regard to an example in which the position where the sound image is formed is controlled by controlling the phase of the ultrasonic wave output from each oscillation device 31 of the parametric speaker 30.

On the other hand, in the present embodiment, an output direction of sound wave output from the oscillation device 31 is changed by actuators 39, and thereby the directivity of the parametric speaker 30 is controlled, and the position where the sound image is formed, in other words, the audible sound is demodulated, is controlled.

As illustrated in FIGS. 15(a) to 15(c), in case of the present embodiment, for example, the parametric speaker 30 includes one (one unit) oscillation device 31, multiple actuators 39 which change the direction of the oscillation device 31 and a support portion 39a on which the multiple actuators 39 are fixed.

The support portion 39a is directly or indirectly fixed to the housing 101 of the navigation apparatus 100. For example, the support portion 39a is formed in a flat type.

For example, the actuators 39 are piezoelectric elements, and are expanded and contracted by controlling an applied voltage. One end of each actuator 39 is fixed respectively to the support portion 39a, and the other end of each actuator 39 is fixed respectively to the oscillation device 31 such as a support member 34 of the oscillation 31. For example, each actuator 39 is installed so as to vertically stand respectively on one surface of the support portion 39a.

The number of actuators 39 can be configured to have two pieces or three pieces. In a case where three actuators 39 are installed, a freedom degree of direction adjustment of the oscillation device 31 is increased. Thus, in the present embodiment, as illustrated in FIG. 13, it is preferable that three actuators 39 be included. An expansion and contraction operation of such actuators 39 is performed by an actuator control unit 49 of the control unit 40.

In addition, as illustrated in FIG. 14, in the present embodiment, for example, the oscillation device 31 is arranged on an end surface 101a.

Figure 15:
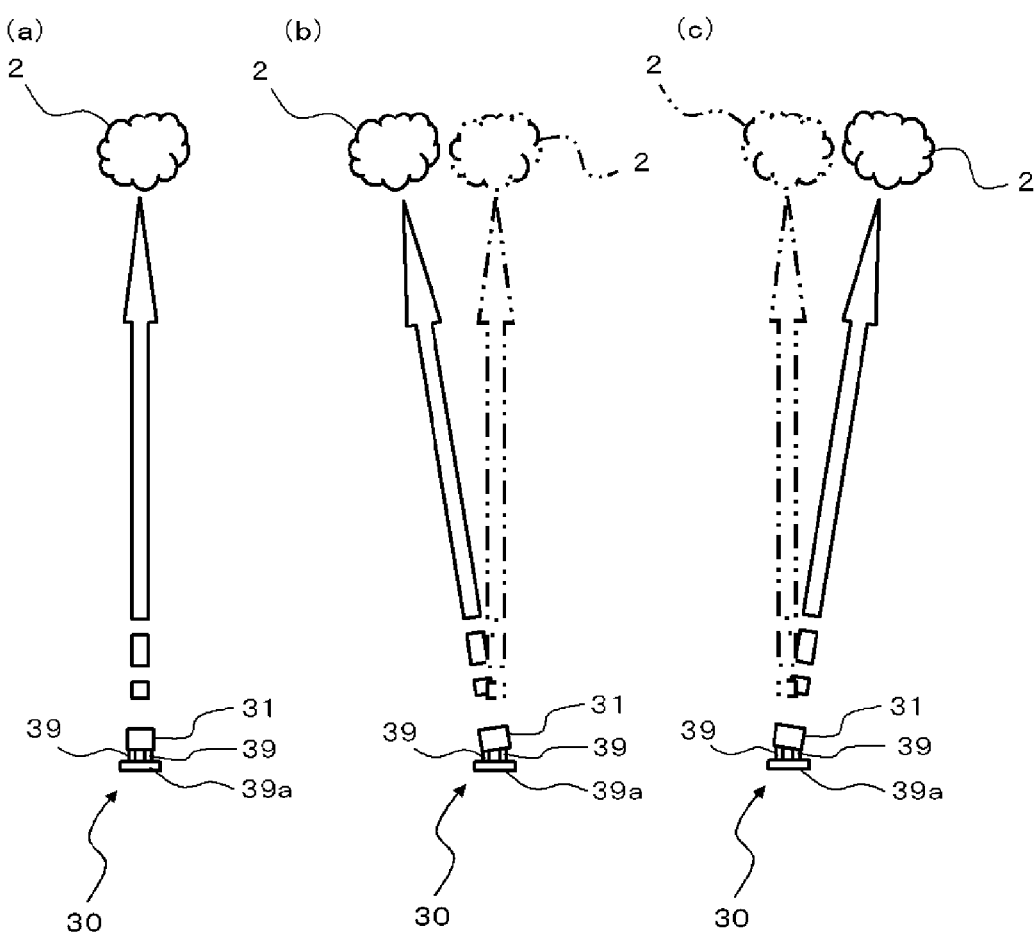
FIGS. 15(a) to 15(c) are schematic diagrams for describing an operation of the navigation apparatus according to the sixth embodiment.

FIG. 15 illustrates an operation in a case where there are two actuators 39, in order to simply describe.

When lengths of each actuator 39 are the same, the output direction of the ultrasonic wave output from the oscillation device 31 becomes a direction opposite to the support portion 39a (in other words, the vibration member 32 of the oscillation device 31 and the support portion 39a are parallel to each other). Thus, the sound image 2 is formed in a front direction of the support portion 39a (FIG. 15(a)).

In addition, any one of the actuators 39 is contracted (or any one of the actuators 39 is expanded), and thereby angle of the oscillation device 31 with respect to the support portion 39a can be changed, and the output of the ultrasonic wave output from the oscillation device 31 can be changed (in other words, the vibration member 32 can be arranged in an inclined state with respect to the support portion 39a). Thus, the sound image 2 is formed in an offset position from the front of the support portion 39a (FIGS. 15(b) and 15(c)).

Thus, in the present embodiment, each actuator 39 is properly expanded, and thereby the sound image 2 can be formed on the left of the user 1, or can be formed on the right of the user 1.

According to the sixth embodiment, the same effect as that of the first embodiment is acquired.

In addition, in case of the sixth embodiment, the output direction of the sound wave output from the oscillation device 31 is changed by the actuators 39, and thereby forming position of the sound image 2 is changed. Thus, it is not necessary that the parametric speaker 30 have the multiple oscillation devices 31 in the array type, for example, it is no problem to have only one oscillation device 31.

Each of the above-described embodiments has been described by assuming that there is one destination, and the sound is heard only from one travel direction at one time, but there may be multiple destinations and the sound may be heard from the travel direction corresponding to the destinations at the same time. In other words, the route search unit 44 determines multiple travel directions, based on the current position information and each position information of the multiple destinations, and the sound control unit 41 may control the parametric speaker 30 so that the sound different from each other from each of the multiple travel direction may be heard to the user 1. In this case, just as the user 1 can selectively hear the information that the user 1 wants to hear, even if the sound different from each other from various directions is heard in a real life, the user 1 can selectively hear the information that the user 1 wants to hear even if the sound is heard respectively from multiple directions.

In addition, each of the above-described embodiments has been described by assuming that the travel direction is a certain place in the horizontal direction, but the destination may be an upper portion (for example, climbing stairs) or a lower portion (for example, climbing down the stairs).

In addition, each of the above-described embodiments has been described by assuming that the position of the destination is fixed, but the destination may be moved. For example, while each of two users with the navigation apparatus 100 that is the mobile terminal apparatus such as that described in the first embodiment moves, the destination information acquisition unit 43 of one navigation apparatus 100 performs an operation to acquire the position information of the other navigation apparatus 100. As a result of the operation, the two users can intuitively recognize mutual positions, and thus the users can rapidly gather at a point by themselves. Such an operation is performed by using the mobile terminal apparatus (the navigation apparatus 100) while calling, and thereby a smooth gathering can be done. In addition, the users are not limited to two people, and may be three people or more.

In addition, while one certain user with the mobile terminal apparatus moves, the destination information acquisition unit 43 in the navigation apparatus 100 of other one or multiple user (s) may acquire the position information of the mobile terminal apparatus of the one certain user. In this case, the other user or the multiple users can intuitively recognize the user's position, and thus the other user or the multiple users can rapidly head for the point of destination of the user, and each user can easily gather.

In addition, it is not limited to that each user has the navigation apparatus 100 which is the mobile terminal apparatus, even in a case where the navigation apparatus 100 is the vehicle mounting type and each user moves in a vehicle, mutual position information is acquired, and a certain user's position information is acquired, in the same manner, thereby a rapid gathering can be done.

This application claims the priority based on Japanese Patent Application No. 2011-013972 filed on Jan. 26, 2011, and entire disclosure of which is incorporated herein.

The invention claimed is:

1. A navigation apparatus comprising:
   a current position information acquisition unit that acquires current position information;
   a travel direction determination unit that determines a travel direction based on the acquired current position information and destination position information of at least one destination;
   a sound unit that outputs a sound; and
   a sound control unit that controls the sound unit so that the sound is output to a user from the travel direction,
   wherein the travel direction determination unit determines a plurality of travel directions based on the current position information and position information for each of a plurality of destinations, and
   wherein the sound control unit controls the sound unit to output a different sound for each of the plurality of travel directions such that each of the plurality of travel directions are output to the user at a same time.

2. The navigation apparatus according to claim 1,
   wherein the sound unit is configured of a directional speaker, and
   wherein the sound control unit forms a sound image of the sound using the sound unit in a position of the travel direction based on the user.

3. The navigation apparatus according to claim 2,
   wherein the directional speaker is a parametric speaker.

4. The navigation apparatus according to claim 1,
   wherein a position relationship detection unit that detects a relative position relationship between the user and the sound unit, and
   wherein the sound control unit controls the sound unit according to the relative position relationship detected by the position relationship detection unit.

5. The navigation apparatus according to claim 1,
   wherein the sound control unit forms the sound image at an area within 30 cm based on the user's ear.

6. The navigation apparatus according to claim 1,
   wherein the navigation apparatus is a mobile terminal apparatus.

7. The navigation apparatus according to claim 1,
   wherein the sound unit is configured of a plurality of speakers that are dispersed and arranged around the driver's seat in a vehicle, and
   wherein the sound control unit selectively outputs the sound from the speaker corresponding to the travel direction among the plurality of speakers.

8. The navigation apparatus according to claim 1,
   wherein the sound control unit allows the sound unit output the sound for transmitting information except for information indicating the travel direction to the user.

* * * * *